June 19, 1928.

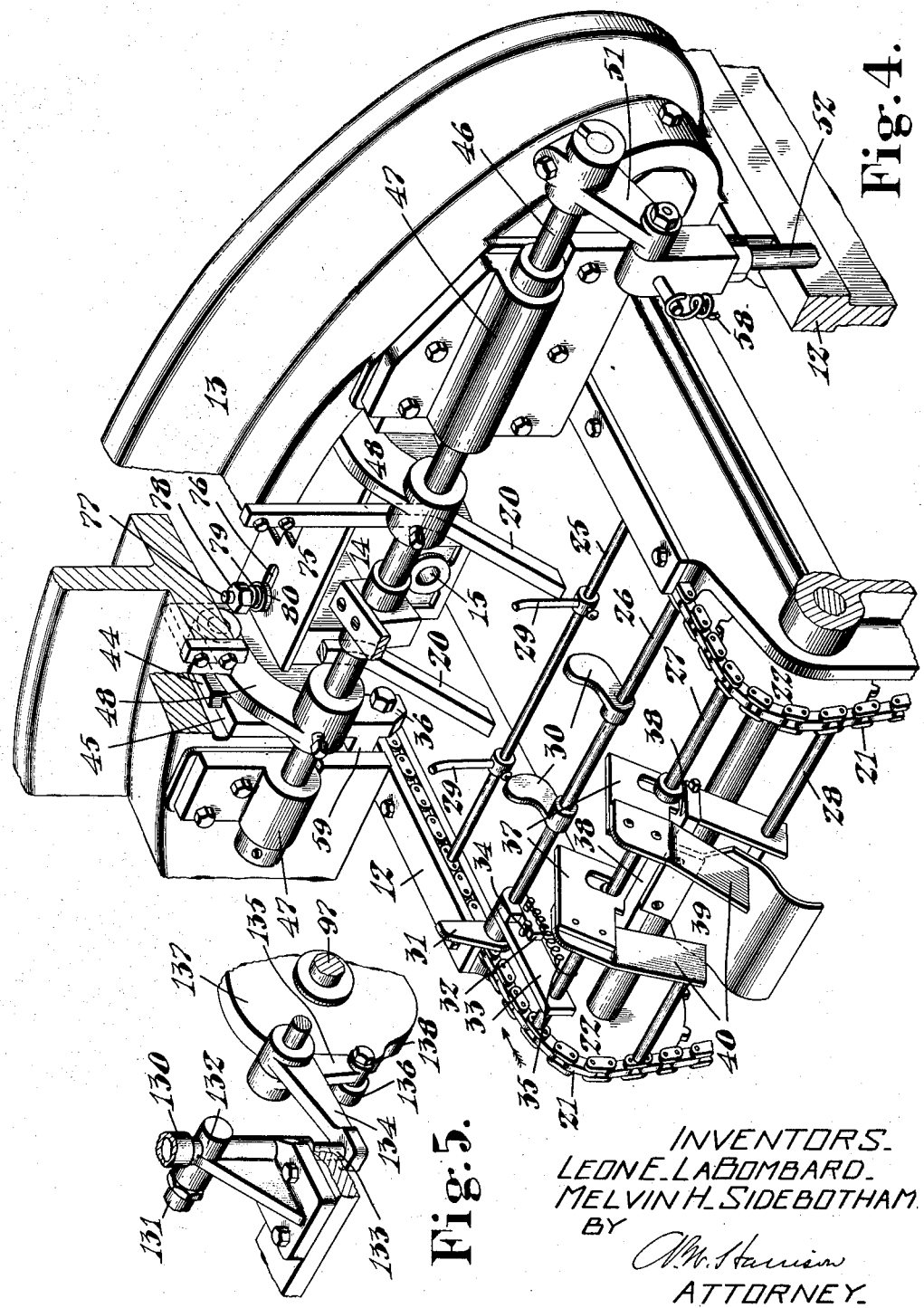

L. E. LA BOMBARD ET AL 1,674,624

MACHINE FOR MAKING PAIL SHAPED BOXES

Filed Nov. 23, 1925    7 Sheets-Sheet 5

INVENTORS.
LEON E. LA BOMBARD.
MELVIN H. SIDEBOTHAM.
BY
ATTORNEY.

INVENTORS.
LEON E. LA BOMBARD.
MELVIN H. SIDEBOTHAM.
BY
ATTORNEY.

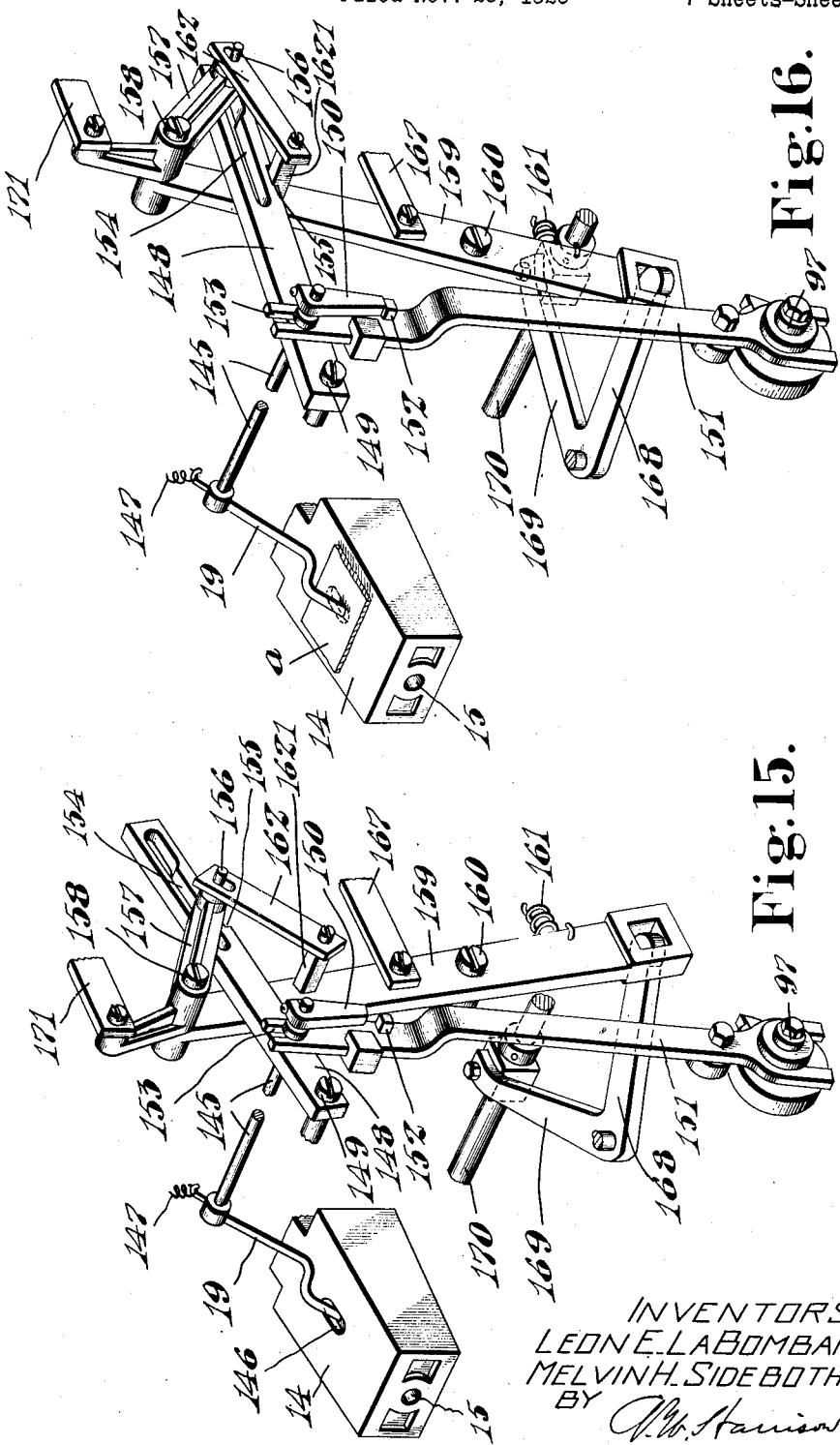

Patented June 19, 1928.

1,674,624

UNITED STATES PATENT OFFICE.

LEON E. LA BOMBARD AND MELVIN H. SIDEBOTHAM, OF CHELSEA, MASSACHUSETTS, ASSIGNORS TO SPECIALTY AUTOMATIC MACHINE COMPANY, OF CHELSEA, MASSACHUSETTS, A CORPORATION OF MASSACHUSETTS.

MACHINE FOR MAKING PAIL-SHAPED BOXES.

Application filed November 23, 1925. Serial No. 70,773.

This invention relates to machines for making paper boxes and has particular reference to machines for folding cut and creased blanks to the tapering form commonly known as ice cream boxes or pails.

Owing to the tapering form of boxes such as referred to, it has been difficult to produce them by machinery that was much more speedy in production than hand folding, this being due to the necessity for causing the folding members to reciprocate at different angles.

The principal object of our present invention is to provide high-speed automatic machines for gluing and folding blanks to produce set-up boxes, especially tapering boxes, which are rectangular in horizontal cross section, and we attain this object by mechanism which includes a form around which the blanks are successively folded, and folding members most of which are continuously movable in a straight path past the form instead of reciprocating.

Another object is to effect stoppage of the machine if one article which is in position to be operated upon fails to leave that position before arrival there of another article, whereby undesirable jamming of the machine is avoided.

With the above stated objects in view, and others hereinafter explained, our invention consists in the construction and combination of parts substantially as hereinafter described and claimed.

Of the accompanying drawings:—

Figure 1 is a side elevation of the machine.

Figure 1ª is a perspective view of some of the details of mechanism shown in Figure 1.

Figure 4 is a perspective view of the travelling and other folding members.

Figure 5 is a detail perspective view of the mechanism which controls delivery of an air blast through the form.

Figures 6, 6A:
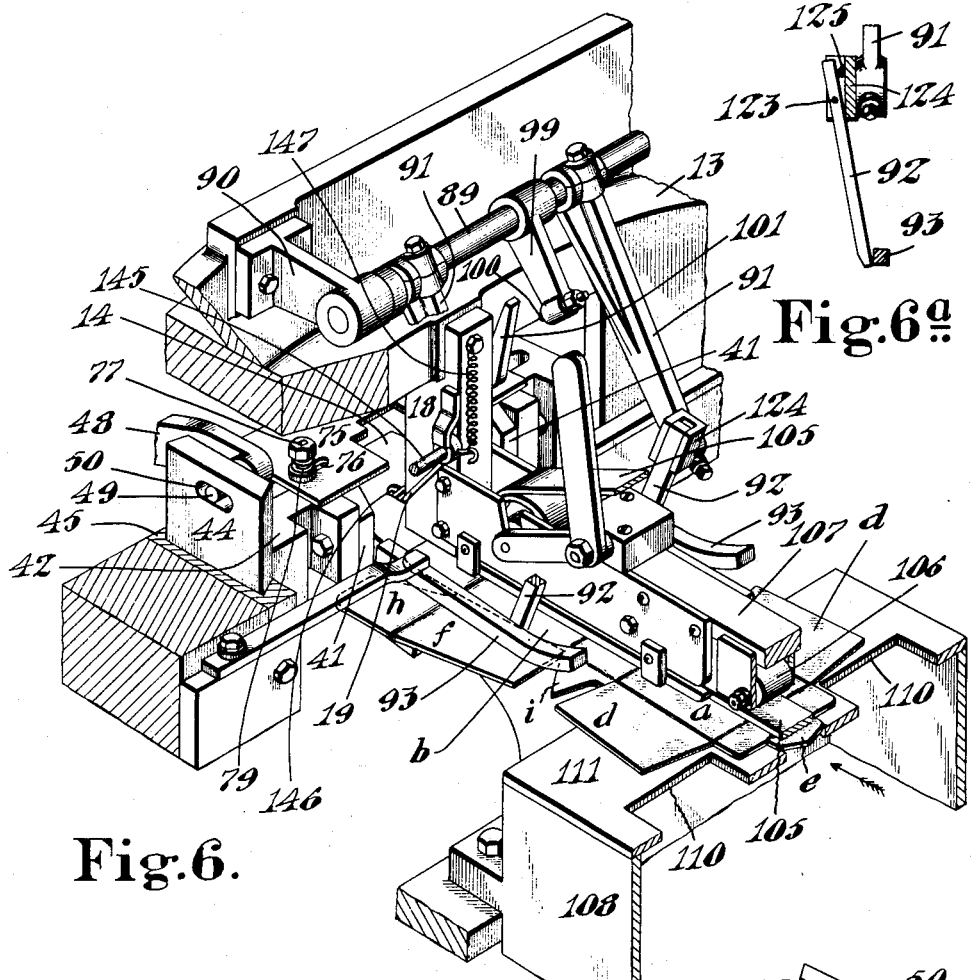
Figure 6 is a perspective view of the mechanism which effects accurate delivery of the blanks successively to the form around which said blanks are folded.

Figure 6ª is a sectional detail of one of the pushing fingers and its mounting.

Figures 7, 8:
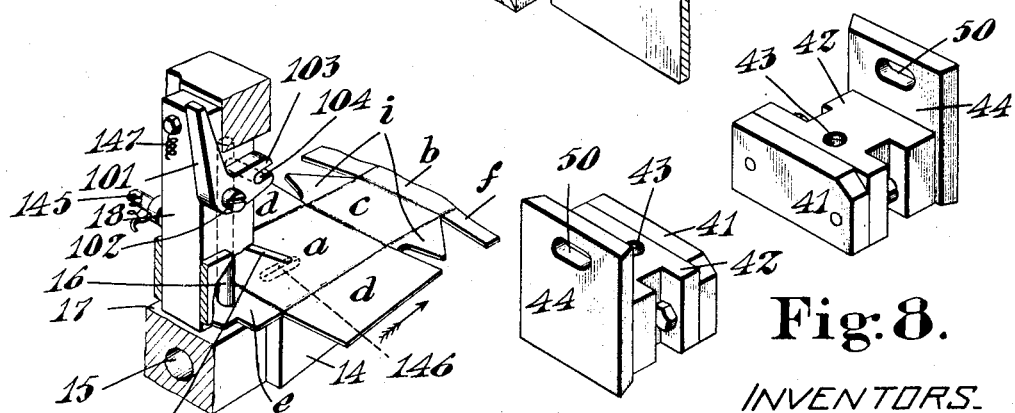

Figure 7 is a detail perspective view of the means for temporarily gripping each blank on the folding form.

Figure 8 is a detail perspective view of the blocks which support the top folding plate.

Figures 9 to 13 are detail perspective views illustrating successive steps of the folding operation of the machine.

Figure 14:
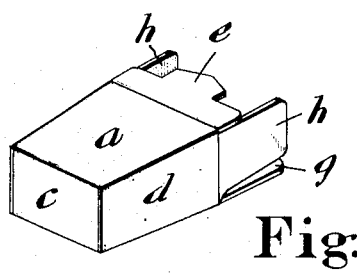

Figure 14 illustrates one of the completely folded boxes.

Figures 15 and 16 are skeletonized perspective views of the mechanism which effects automatic stoppage of the machine as hereinafter described, said views illustrating the parts of said mechanism in their two positions.

Similar reference characters designate similar parts in all of the views.

The frame of the machine comprises side members 12 and an arched portion 13.

Figure 3:
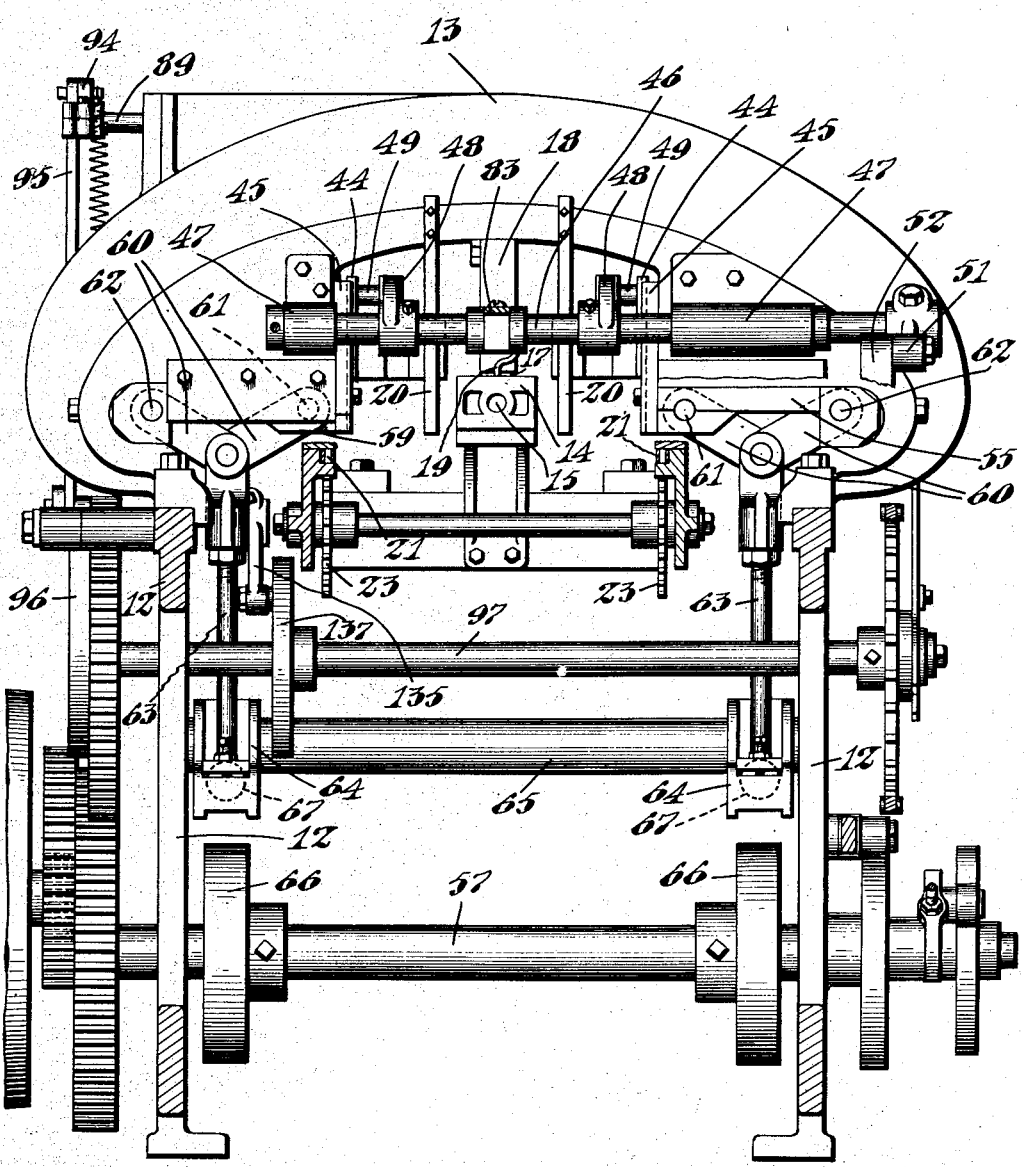
Figure 3 represents a transverse section of the machine, omitting some details in the interest of clearness.

By mechanism described hereinafter, the blanks, with glue on predetermined areas thereof, are delivered in timed succession to the flat top of a rigidly mounted form 14 (Figs. 3, 4, 6, 7, 9 and 10) under the middle of the arch 13. Each blank is converted to complete box form while supported by the form 14 and is then discharged horizontally therefrom by a blast of air delivered through a port 15 in the form. During the folding operation the blank is held firmly by a presser foot 16 which is actuated as hereinafter described to bear on the end flap $e$ of the blank. To reach the position mentioned, the blank is pushed through a narrow space 17 (Figs. 3 and 7) between the lower end of a stationary upright bar 18 and the upper surface of the rear end of the form 14, said bar being carried by and depending from the arch 13. When reaching this position, the blank lifts a small yielding wire finger 19 the purpose of which will be described hereinafter, and the front end of the blank is deflected downwardly by a pair of arms 20 (Figs. 4 and 9) secured to the arch 13 and having inclined lower ends.

The mechanism for effecting most of the folding of the blank around the form 14 comprises folders carried by a pair of chains 21 (Figs. 1, 2 and 4) mounted on sprockets 22, 23, 24, and carrying a group of four transverse rods 25, 26, 27, 28, of which the rod 26 is so mounted in the chains that it can oscillate for a purpose presently explained. The chains are driven as indicated by the direction arrows at a speed and so timed that the entire group of rods and the folding members carried thereby pass the form 14 while a blank is held thereon by the presser or gripper 16.

Figure 9:
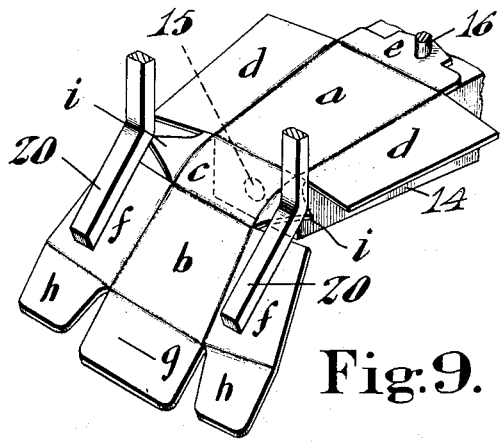
Figure 10:
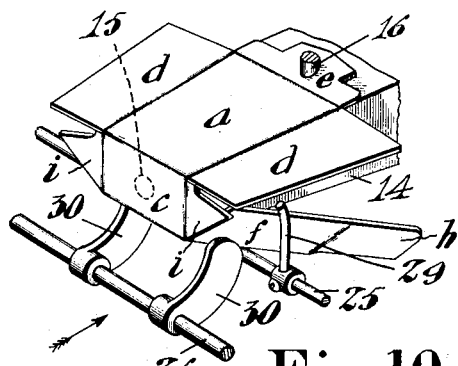

The rod 25 carries two fingers 29 which pass the stationary arms 20 and contact with the portions of the blank indicated at $f$ in Figure 9, bending the entire forward portion of the blank down, said two fingers 29 next turning the flaps $f$ up as indicated in Figure 10. Then a pair of blades 30, carried by the rod 26, engage the side flaps $f$ and fold them up against the sides of the form 14 as indicated by comparing Figures 10 and 11. Such comparison shows that the blades 30 are swung up to effect complete folding up of the flaps $f$. As before mentioned, the rod 26 is mounted in the chains so it can rock. It has an upwardly projecting tappet lug 31 (Fig. 4) and an arm 32 projecting rearwardly. A small bar 33 mounted on the rods 26, 27, carries a pin 34. A spring 35 connected to the rod 27 and to the arm 32 tends to hold the arm 32 of the rod 26 against the stop pin 34 so that the folder blades 30 will pass under the small flaps $i$ of the blank as they pass the position indicated in Figure 10. Immediately thereafter the lug 31 of the rod 26 contacts with a portion of the frame at 36 (Fig. 4) with the result that as the rod 26 continues to travel with the chains the said rod is rocked and the blades 30 swing up to the position illustrated by Figure 11 and fold the flaps $f$ against the sides of the form 14.

Mounted on the two rods 27, 28, are two plates 37 connected by a bridge piece 38 from which a spring presser plate 39 extends rearwardly. The slots in the plates 37 are to compensate for the varying distance between the rods 27, 28, as the portions of the chains which carry said rods travel around the sprockets. The folder plates 37 carry wing members 40 which converge rearwardly.

Figure 11:
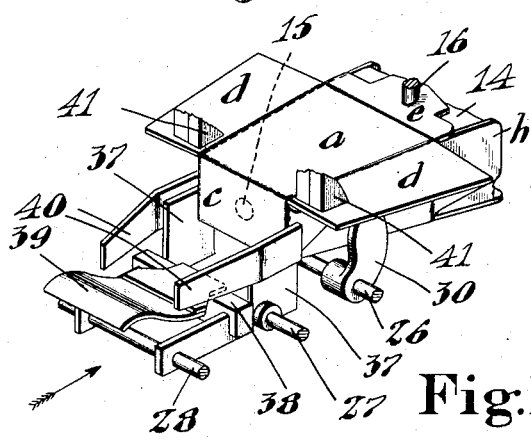
Figure 12:
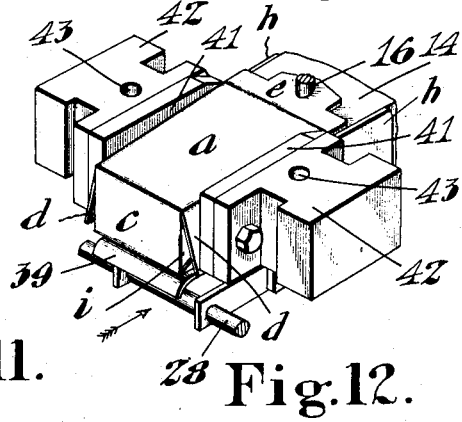

As the chains travel, and while the blades 30 are still holding the flaps $f$ up and sliding therealong, the plates 37 engage the small flaps $i$ and fold them in against the flaps $f$ (Fig. 11) and during further travel to the positions illustrated by Figure 12, the wings 40 and the plate 39 press the flaps $i$ and $f$ in and the section $b$ up against the form 14.

It is to be understood at this point that the under surfaces of the flaps $d$ carry adhesive which has been applied in a manner that will be described hereinafter. The members which act on said flaps $d$ to first fold them down and then press them in are illustrated at 41. They are not carried by the chains but are supported and actuated by the chains so that they have a vertical movement and are moved toward each other after being lowered. Portions of said members 41 are indicated in Figure 11 as when raised to permit the flaps $d$ to pass under them. We will now describe these last mentioned folders and pressers in detail, and the mechanism for operating them. Adjacent opposite sides of the form are two plates 41 (Figs. 6, 8, 11 and 12). Each plate 41 is secured to a block 42 having a threaded hole 43, said block being carried by a vertical plate 44 mounted to slide vertically in a dove-tail way in a plate 45. The two plates 45 and the members carried thereby are actuated toward and from each other by mechanism which will be hereinafter described in connection with Figure 3.

The vertical movements of the members just described are effected by a rock shaft 46 (Figs. 1, 2, 3 and 4) mounted in bearings 47 carried by the arch 13 and having arms 48, each arm 48 having a pin 49 entering a slot 50 in plate 44 (Figs. 6 and 8). The shaft 46 has an arm 51 at one end connected by a rod 52 (Fig. 1) to a lever 53 fulcrumed at 54 and having a roll 55 riding on a cam 56 carried by shaft 57. The cam serves to actuate the rock shaft to effect downward movement of the side folder plates 41 at the proper times to the position indicated in Figure 12, the return movement of the rock shaft to lift the said plates being effected by a spring 58.

Immediately after the blocks 42 carrying the plates 41 have been moved down from the position indicated by Figure 11 to the position indicated by Figure 12, so as to fold the side flaps $d$ down, such movement being effected by the mechanism just described, the said blocks and plates are moved toward each other to press the glue-carrying flaps $d$ against the flaps $i$ and $f$ and subject the overlying flaps to such compression as to effect durable adhesion. This inward movement of the blocks and plates is effected by the mechanism now to be described.

The two plates 45 which have vertical ways for the portions 44 of the side folders and pressers (Fig. 4) have bases 59, each being mounted in a horizontal slideway in the arch 13. Toggle members 60 (Fig. 3) are connected at 61 to each slide or base and at 62 to a fixed portion of the arch. The joint of each toggle is connected by a rod link 63 with a lever 64 (illustrated by dotted lines in Figure 1) fulcrumed on transverse rod 65 and actuated by a cam 66 carried by shaft 57. Each rod link 63 is connected to its actuating lever 64 by a ball and socket joint 67.

As illustrated by Figures 2, 4, 6 and 13, a plate 75 is mounted on the two blocks 42, said plate having slots 76 up through which pins 77 extend from the threaded holes 43 in the blocks 42. Each pin has a nut 78 threaded thereon and a spring 79 coiled around the pin is confined between said nut and a washer 80 bearing on the top of the plate 75. This plate 75 therefore serves to exert a yielding pressure on the top of the box when the side folders 41 move down as hereinbefore described, and while the final folding operation is completed. In other words, the plate 75 moves down with the members 41 but reaches the section *a* of of the blank just before the members 41 complete their downward movement. During the completion of said downward movement the springs 79 are compressed, and then when the plates 41 and their carrying-blocks 42 move toward each other as hereinbefore described, the pins 77 around which the springs are coiled slide along the slots 76 in the pressure plate 75.

Figure 13:
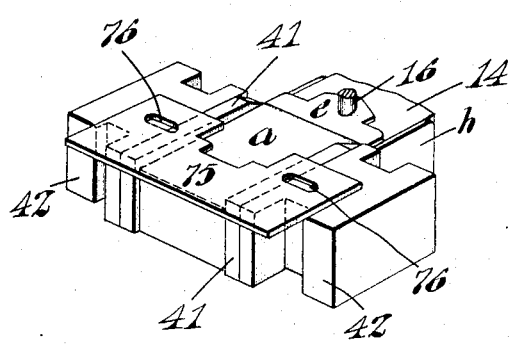

The folders which are carried by the chains 21 travel very fast, making, in fact, more 3000 traverses an hour. The side members 41 move in as illustrated by Figure 13 just after the travelling folders have passed the form 14. Then they retreat and the completely shaped box is discharged horizontally from the form by a strong puff of air delivered through the port 15. The means for controlling said pneumatic discharge will be described hereinafter.

Figure 1:
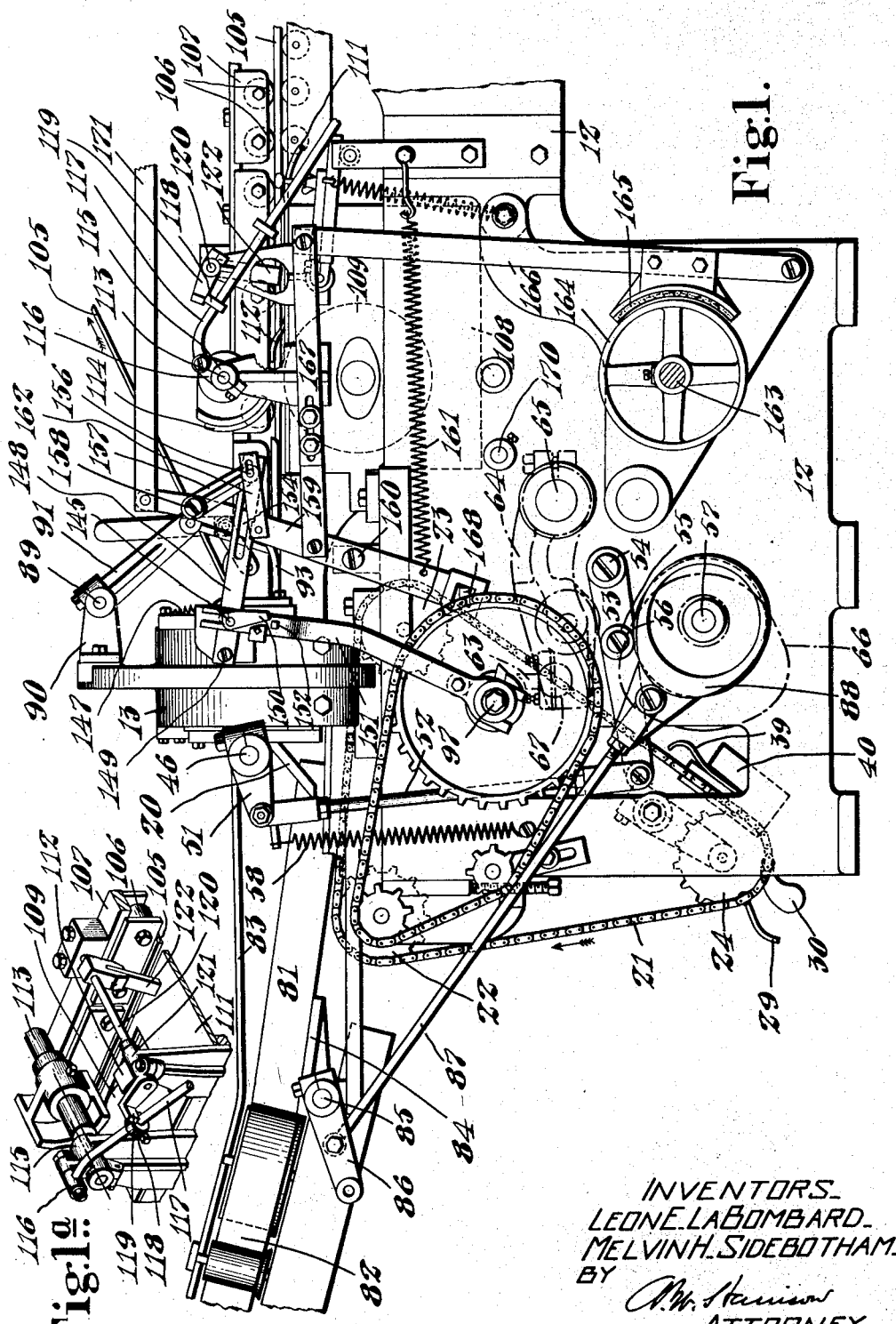
Figure 2:
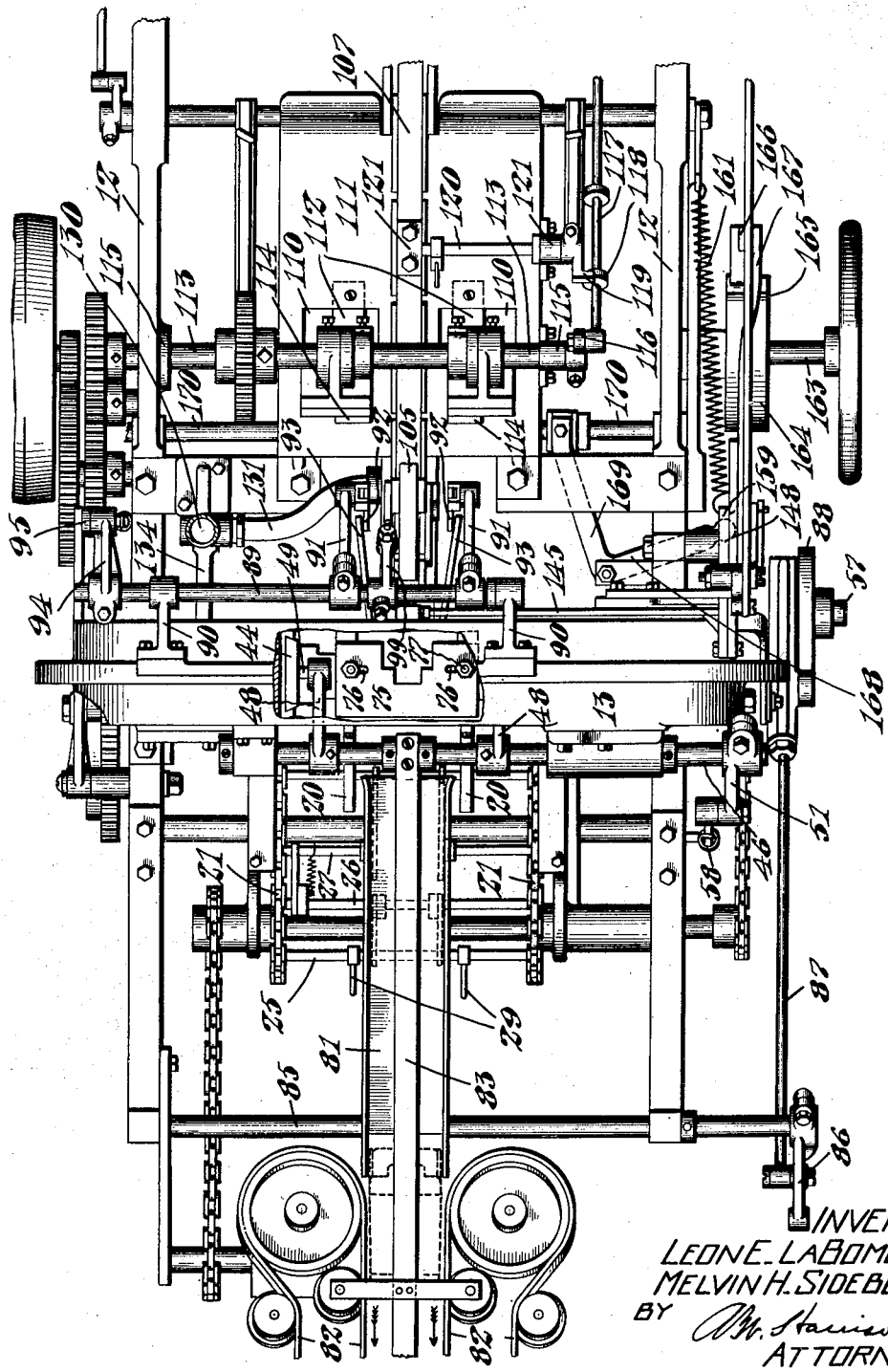
Figure 2 is a plan view of the machine, a central portion of the frame arch being broken out to clearly show parts below.

Each completed box is shot from the form through a trough 81 (Figs. 1 and 2) to a position between the receiving ends of two slowly travelling belts 82, such position being indicated by dotted lines in Figure 2. Since the boxes are of tapering form, they automatically nest into each other between said belts in condition to be picked up in counted groups for packing. The belts not only serve to deliver the boxes from the machine in nested groups or columns, but they maintain sufficient pressure against the sides of the boxes to hold the glue-carrying areas in close contact until the glue becomes firmly set.

To aid in guiding the boxes to the belts, a strip 83 is connected at one end to a sleeve loosely mounted on the rock shaft 46 and an outer part thereof rests on a cross strip that is supported in any suitable manner, as by resting on the tops of the spindles of two of the belt guiding rolls, the mounting of the said strip being such that it can be swung up about the axis of the shaft 46 if said strip needs to be displaced for any reason.

The trough 81 is automatically shifted or swung up and down so that while it will be in position to guide each completed box shot from the form to the belts 82, it will not be in a position to interfere with the passage or travel of the chain-carried folders to operate on the next blank assembled with the form. To this end, the trough 81 is carried at its outer end by a bracket 84 (Fig. 1) rigidly secured to a rock shaft 85, the latter having an arm 86 to which one end of a rod or link 87 is connected. A cam or eccentric 88 carried by the shaft 57 actuates the rod 87 at the proper times to swing the trough 81 up and hold it long enough for the chain-carried folders to pass it, and then lower the trough to position to receive the next pneumatically-ejected completed box.

As has been mentioned, each blank to reach the position illustrated by Figure 9, is pushed through the narrow space 17 (Fig. 7) under the bar 18. The mechanism for so pushing the blanks, successively, will now be described.

A rock shaft 89 is mounted in bearings provided by brackets 90 (Figs. 1, 2 and 6) projecting from the arch 13, and has a pair of arms 91 one of which is broken away in Figure 6 to avoid confusion of parts behind it. Each arm 91 carries, adjustably, a finger 92 the lower end of which is guided by a bar 93 in a path so that the tips of the two fingers 92 will, when they swing forward, engage the rear edges of the two flaps *d d* of the blank and push the blank the correct distance to properly locate it on the form 14. The fingers 92 also laterally center the blank as will be described hereinafter. It is to be understood that other mechanism, yet to be described, feeds the blanks properly spaced and timed to deliver each blank farther than illustrated by Figure 6 before the rock shaft 89 is actuated to cause the fingers 92 to engage the rear edge of a blank.

The rock shaft 89 has at one end a short arm 94 to which the upper end of a rod 95 (Fig. 3) is pivoted, a roll at the lower end of the said rod engaging a cam 96 carried by shaft 97. As illustrated in Figure 7, the tip of the presser foot or gripper 16 is bevelled or inclined so that the front edge of a blank pushed by the fingers 92, contacting with such inclined surface, will lift the said presser foot slightly so that the blank can pass under it. The shaft 89 has, between the two arms 91 (Figs 2 and 6), an arm 99 carrying a tappet 100 in the form of an adjustable screw, which is adapted to contact with the upper end of a small elbow lever 101 (see also Fig 7) pivoted at 102 to the bar 18 and having a fork 103 embracing a pin 104 projecting laterally from the stem of the presser foot 16. The timing of operation of the rock shaft 89 is such that, just as the fingers 92 have pushed the blank to the proper position on the form 14, the arm 99 acts on the lever 101 to force the presser foot 16 down on the portion e of the blank and hold it there during the operation of the chain-carried folding members. Said members pass the form and complete their work in a small fraction of a second.

By suitable feeding mechanism not necessary to illustrate in all details, the blanks are fed singly and properly spaced or timed, to position to be engaged by the pushing fingers 92. Said blanks are carried to said position by a belt 105 (Figs. 1, 2 and 6) running under a row of idle rolls 106 mounted in a roll cage 107. The blanks are carried along by said belt cooperating with a lower row of suitably supported idle rolls.

Mounted in a glue box 108 are two glue rolls 109, one at each side of the blank forwarding belt and rolls, the peripheries of the glue rolls being exposed through openings 110 (Fig. 2) in the cover 111 of the glue box. Secured to the cover 111 and extending partially over the peripheries of the glue rolls (Figs. 1, 1ª, and 2) are small strips 112 which guide the side flaps of the blanks to a plane high enough to avoid contact with the glue rolls unless said flaps are acted upon by something else to depress them into contact with said rolls. This is because only the flaps d d are to receive glue. To effect contact of the under surfaces of the two flaps d d with the glue rolls, a shaft 113 carries two segments 114, said shaft being driven at a timed speed of rotation to ensure depression of the side flaps d d of each passing blank into contact with the glue rolls.

It is important that the segments 114 shall not, themselves, contact with the glue rolls if no blank is passing, as they would then be coated with glue that would be transferred to the upper and wrong surface of the flaps of the next blank. Therefore the segment-carrying shaft 113 is so constructed or mounted, and operated, as to prevent the segments from contacting with the glue rolls if, while rotating, no blank is presenting its flaps d d under the segments. To this end, the shaft 113 is constantly driven by gearing illustrated in Figure 2 but, as illustrated by Figure 1ª, the ends of the shaft are eccentric or off-set relatively to the portion which carries the segments, said off-set ends being mounted in bearings 115. Consequently the portion of the shaft which carries the segments is constantly moving up and down. One end of the shaft 113 has an arm 116 to which is connected a rod 117 that is constantly reciprocated by a cam and spring or any other suitable well-known mechanism not necessary to illustrate, said rod having a fixed collar 118 (Fig. 1). Coacting with said collar is an arm 119 carried by a shaft 120 loosely mounted in bearings 121 (Fig. 2) and having a finger 122 (Figs. 1 and 1ª) the lower end of which is in the path of blanks passing over the top of the glue box.

The structure and timing of operation of the parts just described is such that the reciprocating rod 117, by slightly rocking the shaft in its eccentric bearings, causes the segments to depress the flaps d d of each passing blank and then rise a little higher. Each passing blank swings the finger 122 so as to act through its shaft 120 to swing the catch arm 119 out of the way of the collar 118 of the constantly reciprocating rod 117, thereby permitting said rod to cause the segment-carrying shaft to be lowered. But if no blank comes along to actuate the finger 122, the latter remains down and permits the catch arm 119 to remain lowered in the path of the catch collar 118. Unless the collar 118 can pass down below the catch arm 119, the segments 114 during their rotation do not swing down low enough to depress anything or to contact, themselves, with the glue rolls. Lowering of the shaft so that the segments will rotate in the lower position can occur only when a blank, arriving toward position to be acted upon by the segments, contacts with and swings the finger 122.

Each blank that has received glue on the under surfaces of the two flaps d d is advanced by the belt 105 to position to have the rear edges of said flaps engaged by the pushing fingers 92 hereinbefore described. To enable said fingers to also laterally center the blanks which are of an irregular shape sometimes difficult to control, each finger (Figs. 6 and 6ª) is pivotally mounted at 123 in a recess in a small block 124 at the lower end of arm 91. Above the pivot 123 a spring 125 in the recess tends to press the finger laterally so that its lower end bears against the inner side of the guide bar 93. As illustrated in Figure 2, the two bars 93 converge in the direction of travel of the blanks, and said bars 93 and the pushing fingers are so spaced that when the fingers first engage the rear edge of the blank flaps d d such engagement is slightly away from the side edges of the end flap e. Then, as the fingers swing forward to perform their pushing action, they swing inward on their pivots 123 due to the ends of the fingers riding along the inner faces of the two converging guide bars 93 until said finger ends arrive at the corners or angles where the edges of the flaps d and e meet, so that the said fingers not only push the blank to correct longitudinal position on the folding form but also locates it accurately laterally.

After the blank has been completely folded around the form 14 as has been described, it is ejected from the form by a blast of air delivered through the port 15. The air, from any suitable compressor or blower is supplied through pipes 130, 131, (Figs. 2 and 5), the latter leading to the port in the folder form. To control the air and effect the discharge of each folded box, a suitable valve is located in the casing 132 and the stem 133 of the valve is actuated by the arm 134 of an elbow lever the other arm 135 of which has a roll 136 contacting with a disk 137 carried by the shaft 97 (see also Fig. 3). The disk 137 has a recess 138 which, when said recess reaches the roll 136, permits a sudden or quick dropping of the valve stem 133 to open the air valve and effect a quick removal of the completely folded box before the arrival of another blank on the folding form.

If for any reason a completed box should fail to be removed from the form 14 it is important that the machine should be stopped automatically because the arrival of another blank on the form would cause a jam. We will now describe the mechanism for effecting such stoppage, which mechanism is adaptable to other machines than the one hereinbefore described.

In the present machine the finger 19 is the controlling member of the throw-off mechanism. Said finger (Figs. 6, 15, and 16) is secured to a rock shaft 145 and extends around the upright 18 into a recess 146 in the top of the form 14 so that any blank arriving on the form must swing the finger 19 up and rock the shaft 145 against the pull of a spring 147 connected to a rear pin of the shaft. The other end of the shaft 145 (see also Figure 1) passes through a lever 148 pivoted at 149, and at the extreme end of the shaft 145 is a downwardly extending arm 150. Projecting from a vertically slidable bar 151 is a lug 152 adjacent the tip of the arm 150. The bar 151 is given a slight lift, once for each passing blank, by a small cam carried by the shaft 97. To guide the upper end of the bar 151 it is forked as at 153 to embrace the shaft 145.

The lever 148 has a slot 154 the outer end of which is enlarged and the under edge of which has a notch 155.

Movable along the slot 154 is a pin 156 carried by a lever 157 pivoted at 158 to the upper end of a lever 159, the latter being pivoted at 160 to a portion of the frame of the machine. A spring 161 is connected to the lever 159 below its pivot, the purpose of said spring being explained presently.

The pin 156 extends outwardly through a short slot in a strip 162 pivoted to the lever 159.

The main or drive shaft 163 of the machine has a brake wheel 164 (Fig. 1) with which a brake 165 carried by lever 166 cooperates. The upper end of the brake lever 166 is connected by a link 167 with the lever 159.

The lower end of the lever 159 has an opening which receives one arm 168 of an elbow lever the other arm 169 of which (Figs. 2, 15, and 16) is connected to a slide rod 170 to operate a suitable belt shifter or a clutch (not necessary to illustrate) for starting or stopping the machine.

The upper end of the lever 157 is connected to a link or rod 171 extending along the machine to enable the mechanism just described to be actuated by the operator when it is desired to start or stop the machine manually.

The operation of the throw-off mechanism is as follows:—

If a folded box fails to be removed from the form 14 and another blank approaches it, it might cause a very undesirable jam if the machine was not stopped. When the machine is running properly, the parts just described are in the positions illustrated by Figures 1 and 15, the slide bar 151 rapidly rising and falling and the arm 150 of the rock shaft 145 swinging laterally according to the presence or absence of a blank on the form to raise or release the finger 19. The raising of the finger 19 rocks the shaft 145 so as to swing the tip of the arm 150 into the path of the upwardly moving lug 152. If the folded box has not been removed from the form so as to let the finger 19 drop into the recess 146 in the form, said finger and the arm 150 of the shaft 145 remain in the positions illustrated by Figure 16. Then the next upward movement of the slide bar 151 causes its lug 152 to contact with the tip of the arm 150 and swing the lever 148 up on its pivot 149. This because, as described, the shaft 145, which carries the arm 150, passes through said lever 148. The upward swing of the lever 148 releases its notch 155 from the stud 1621 projecting from lever 159 (to which stud the strip 162 is pivoted), and such release permits the spring 161 to throw the lever 159 from the position illustrated by Figure 16 to the position illustrated by Figure 15. This movement of the lever 159 pulls the link 167 so as to actuate the lever 166 to apply the brake. At the same time the lower end of the lever 159, swinging to the right, actuates the elbow lever 168, 169 so as to slide the transverse rod 170 and either shift a belt or disconnect a clutch. The stopping of the machine in the manner described will happen or be effected before the arrival of another blank close to or onto the form 14, this being due to the relative timing of the operation of the different parts of the machine.

The object of the strip 162 is to enable an operator to stop or start the machine manually. To manually start the machine, the operator actuates the hand link 171 to the right (Fig. 15). This swings the lever 157 so that its pin 156 shifts to the other end of the short slot in the strip 162 at which time the members 157, 159, 162 form a locked triangle so that continued pull on the hand link 171 in the same direction shifts the parts to the positions illustrated by Figure 16, the notch 155 in the lever 148 automatically engaging the stud 1621.

To manually effect stopping of the machine, the operator pushes the hand link 171 toward the left (Fig. 16) and this oscillates the lever 157 and swings the lever 148 up and separates its notch 155 from the stud 1621 so that the spring 161 can throw the parts to the positions illustrated by Figure 15.

As the driving mechanism and gear connections of the several shafts may be of any type to provide for the proper relative timing of operation of the various parts of the machine, it is unnecessary to describe herein the particular members employed for this purpose in the machine illustrated.

The operations of the various parts of the machine have been explained in connection with the descriptions of the construction of such parts, and therefore a description of the operation of the machine as a whole is unnecessary.

Having now described our invention, we claim:—

1. A box-making machine having a stationary form mounted in substantially horizontal position, and a series of successively operating folding members movable past said form.

2. A box-making machine having a form, a series of successively operating folding members movable past said form, and pneumatic means for removing each box from the form after the passage of the folding members.

3. A box-making machine having a stationary form, means for transporting blanks singly and successively to position adjacent to said form, means for applying glue to selected areas of each blank while on its way to the form, and folding members movable past the form.

4. A box-making machine having a stationary form provided with an air port, means for folding box blanks successively on said form, and means for intermittently effecting a blast of air through said port to remove folded boxes from the form.

5. A box-making machine having a stationary form, means for feeding flat blanks singly thereto, a gripper for temporarily holding each blank against the form, and folding members for operating on said blank while held by the gripper.

6. A box-making machine having a form, means for feeding flat blanks singly to one surface thereof with a portion projecting beyond the form, means for deflecting the projecting portion of the blank to position at an angle to said surface of the form, and folding members movable in a path to operate on the deflected portion of the blank.

7. A box-making machine having a form, a pair of chains, rods carried by the chains, and folding members carried by said rods, said chains being mounted and driven to cause the rods to travel below the form and the folding members to pass opposite sides of the form.

8. A box-making machine having a form, a pair of chains, and a series of rods carried by the chains, the first rod having a pair of folding pins, the next rod being mounted to rock and having folding blades, and the next rods carrying folding and pressing plates.

9. In a box-making machine, the combination with a taper-shaped form, of means for partially folding a blank about said form, and movable pressers to effect further folding of the blank, means being provided to move the pressers in a direction substantially parallel with the sides of the form and also toward the form.

10. In a box-making machine, the combination with a taper-shaped horizontally mounted form, of means for partially folding a blank about said form, and pressers movable both vertically and toward opposite sides of the form to effect further folding of the blank.

11. In a box-making machine, the combination with a taper-shaped horizontally mounted form having an exposed end to permit removal of completed boxes therefrom, of means for partially folding a blank about said form, pressers movable both vertically and toward opposite sides of the form, and means for ejecting the completely folded boxes from the exposed end of the form.

12. In a box-making machine, the combination with a form, of successively operating folding members movable past said form, and pressers movable in a direction parallel with the sides of the form and also toward the form.

13. In a box-making machine, the combination with a form, of means for partially folding a blank about said form, and means including a yieldingly mounted pressure plate movable toward one side of the form.

14. In a box-making machine, the combination with a horizontally mounted form, of a series of successively operating folding members movable past the form, a pair of side members movable both vertically and toward opposite sides of the form, and a pressure plate movable toward the upper surface of the form.

15. A machine substantially as specified in claim 14, the pressure plate being yieldingly mounted on the pair of side members.

16. The combination with a machine having a stationary form and means for folding blanks successively on said form and means for pneumatically removing folded blanks therefrom, of guiding means for ensuring nesting of the pneumatically removed folded blanks.

17. The combination with a machine having a form and means for folding blanks successively on said form and means for pneumatically removing folded blanks therefrom, of a trough in position to receive said folded blanks, and a pair of belts in position to receive between them the folded blanks from the said trough.

18. The combination with a machine having a form and cooperating folders including successively operating members movable past the form, of means for pneumatically removing folded blanks from the form, a movable trough for receiving the removed blanks, and means for shifting the trough to cause it to alternately occupy a position to receive a folded blank and a position out of the way of the travelling folding members.

19. A box-making machine having a stationary form, means for conveying blanks toward said form, means for pushing each blank to accurate position on the form, and folders for operating on each blank after it is positioned on the form.

20. A box-making machine having a stationary form, means for conveying blanks toward said form, means for pushing each blank to accurate position both laterally and longitudinally on the form, and folders for operating on each blank after it is positioned on the form.

21. In a box-making machine having a stationary form and means for folding blanks thereon, means for conveying flat blanks singly toward said form, and oscillating arms for pushing each blank to accurate position on the form.

22. In a box-making machine having a stationary form and means for folding blanks thereon, means for conveying flat blanks singly toward said form, and a rock shaft having a pair of arms to engage the rear edge of each blank and push it onto the form.

23. In a box-making machine having a stationary form and means for folding blanks thereon, means for conveying flat blanks singly toward said form, a rock shaft having a pair of pushing members to engage the rear edge of each blank, and means for causing the operative ends of said pushing members to converge as they move in pushing direction.

24. A box-making machine having a stationary form and means for folding blanks thereon, means for conveying blanks singly toward said form, means for pushing each blank to accurate position on the form, and means for exerting pressure on a portion of the blank after it arrives in said position to hold the blank during the folding operation.

25. A box-making machine having a stationary form and means for folding blanks thereon, a pair of glue rolls, means for conveying blanks singly toward said form with some flap portions of the blanks passing the glue rolls out of contact therewith, and means for pressing other flap portions of the blanks into contact with the glue rolls.

26. A box-making machine having a stationary form and means for folding blanks thereon, a pair of glue rolls, means for conveying blanks singly toward said form with some flap portions of the blanks passing the glue rolls out of contact therewith, and a rotary shaft having segments for pressing other flap portions of the blanks into contact with the glue rolls.

27. A box-making machine having a stationary form and means for conveying blanks thereto and then folding them thereon, a pair of glue rolls, a rotary shaft having segments for pressing flap portions of the blanks into contact with the glue rolls, means for continuously raising and lowering said shaft and its segments, and means controlled by the blanks approaching the glue rolls and segments to permit lowering of said shaft and segments only when a blank is approaching said position.

28. In a box-making machine having a form and means for delivering blanks thereto and folding them thereon and means for removing the resulting boxes therefrom, means for stopping the machine if a completed box fails to leave the form in time to permit the unobstructed arrival of a blank to position to be folded on the form.

29. A box-making machine having a form, means for conveying blanks singly to the form, means for folding each blank on the form, means for removing each resulting box from the form, a finger in position to be displaced by a blank arriving on the form, and means controlled by said finger for effecting stoppage of the machine if a completed box fails to leave the form before the arrival there of another blank.

30. A box-making machine having a form provided with a recess, means for conveying blanks singly to the form, means for folding each blank on the form, means for removing each resulting box from the form, a movable finger adapted to project into the recess in the form and to be raised therefrom by the arrival of a blank on the form, and means controlled by said finger for effecting stoppage of the machine if a completed box fails to leave the form before the arrival there of another blank.

31. A machine for operating on articles delivered singly to a given position for such operation, said machine having a movable finger in position to be shifted and held displaced by each article arriving in position to be operated upon, and means controlled by said finger for effecting stoppage of the machine if a following article approaches close to position for operation while said finger remains displaced.

32. A box-making machine having a stationary form and cooperating members for acting upon blanks to fold them successively about said form, said machine having a movable member in position to be shifted by a blank arriving on the form, and means controlled by said movable member for effecting stoppage of the machine if the folded blank fails to leave the said form before the arrival of another blank.

In testimony whereof we have affixed our signatures.

LEON E. LA BOMBARD.
MELVIN H. SIDEBOTHAM.